United States Patent
Aluru et al.

Patent No.: US 11,341,621 B2
Date of Patent: May 24, 2022

(54) ENHANCED IMAGING SYSTEM FOR A MOTOR VEHICLE (71) Applicant: GM Global Technology Operations LLC, Detroit, MI (US)

(72) Inventors: Sai Vishnu Aluru, Commerce, MI (US); James A. Carpenter, Rochester Hills, MI (US); Jayasimha V. Rao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 268 days.

(21) Appl. No.: 16/809,141

(22) Filed: Mar. 4, 2020

(65) Prior Publication Data

US 2021/0279846 A1 Sep. 9, 2021

(51) Int. Cl.
H04N 5/235 (2006.01)
G06T 5/00 (2006.01)
G06T 5/40 (2006.01)
G06T 1/20 (2006.01)
B60K 35/00 (2006.01)

(52) U.S. Cl.
CPC .............. G06T 5/009 (2013.01); B60K 35/00 (2013.01); G06T 1/20 (2013.01); G06T 5/40 (2013.01); H04N 5/2351 (2013.01); H04N 5/2355 (2013.01); B60K 2370/152 (2019.05); B60K 2370/176 (2019.05); (Continued)

(58) Field of Classification Search
CPC .......... G06T 5/009; G06T 5/40; G06T 5/007; G06T 1/20; G06T 2207/10004; G06T 2207/10016; G06T 2207/30252; G06T 2207/20208; B60K 35/00; B60K 2370/152; B60K 2370/176; B60K 2370/1523; B60K 2370/1529; B60K 2370/52; H04N 5/2351; H04N 5/2355; H04N 5/23293
See application file for complete search history.

(56) References Cited

U.S. PATENT DOCUMENTS 9,197,789 B2  11/2015  Mukhopadhyay et al.
9,866,805 B2  1/2018  Bechtel et al.
(Continued)

FOREIGN PATENT DOCUMENTS

CN  104517118 A  *  4/2015  ......... G06K 9/00362
JP  5182555 B2  *  4/2013  ............ G06T 5/009

Primary Examiner — Matthew C Bella
Assistant Examiner — Kathleen M Broughton
(74) Attorney, Agent, or Firm — Vivacqua Crane, PLLC (57) ABSTRACT An enhanced imaging system for a motor vehicle includes a vision processing module that generates a data signal, in response to the camera capturing at least one of the video and the image. A graphics processor is configured to tone map the video or image to generate an RGB histogram including an overall tonal range. The processor is further configured to compare the overall tonal range to a tonal threshold. The processor detects one or more objects having a boundary that separates an interior region having an object tonal value from an exterior region having an exterior tonal value. The processor generates an optimized signal for increasing a difference between the object tonal value and the exterior tonal value, in response to the overall tonal range being above the tonal threshold. The system can further include a display device for displaying an optimized video or image.

20 Claims, 4 Drawing Sheets (52) U.S. Cl.
CPC ............... *G06T 2207/10004* (2013.01); *G06T 2207/10016* (2013.01); *G06T 2207/30252* (2013.01)

(56) References Cited

U.S. PATENT DOCUMENTS

| | | | |
|---|---|---|---|
| 2015/0092066 A1* | 4/2015 | Geiss | H04N 5/235 348/180 |
| 2018/0048801 A1* | 2/2018 | Kiser | H04N 9/735 |
| 2019/0295504 A1* | 9/2019 | Xiong | G09G 5/10 |

* cited by examiner

ENHANCED IMAGING SYSTEM FOR A MOTOR VEHICLE

INTRODUCTION

The present disclosure relates to display systems for motor vehicles, and more particularly to a system and method for enhancing driver vision while operating a motor vehicle under degraded visual conditions.

Automotive manufacturers and suppliers are continuously investigating technologies that capture and display outdoor scenes to enhance driver vision. The captured outdoor scenes have an image quality that is typically degraded due to poor weather conditions, such as fog, haze, smog, cloud, and rain. More specifically, for road traffic, fog can be categorized as light fog that can generally limit visibility to 1000 m and dense fog that can limit visibility to 100 m. Particles, mainly water droplets, can be suspended or float in the atmosphere where the particles absorb or scatter light. The light received by the camera or the observer is attenuated through water droplets to diminish contrast and thus degrade the image quality of the outdoor scene. A whiteout or milky weather condition perceived by the camera or the observer is known as airlight. These two phenomena of attenuation and airlight jointly produce a degraded image.

Vehicles can have a Driver's Vision Enhancer (DVE) system, which is a passive thermal imaging system typically used to enhance a driver's viewing capabilities while operating under degraded visual conditions, such as darkness, fog, smoke, smog, or haze. The DVE system consists of a Display Control Module (DCM), Sensor Module (SM), and interfacing manual and Electronic Pan and Tilt Modules (PTM and EPTM). The DVE system further includes a thermal imaging camera configured to generate a thermal image using infrared radiation, similar to a common camera that forms an image using visible light. However, while visible light cameras are configured to capture wavelengths in the range between 400 and 700 nanometers, thermal imaging cameras are configured to capture wavelengths in the range between 1,000 nm (1 µm) and 14,000 nm (14 µm). The driver may not be able to quickly understand or accurately interpret thermal images while operating the motor vehicle, and specifically when the objects have erratic temperatures. In addition, thermal imaging cameras with a pixel array of 1280×1024 can be expensive as compared to visible light cameras, and the refresh rate can have a refreshing value of 5-15 Hz.

Thus, while existing systems and methods for enhancing the driver's vision achieve their intended purpose, there is a need for a new and improved system and method that addresses these issues.

SUMMARY

According to several aspects of the present disclosure, an enhanced imaging system for a motor vehicle includes a vision processing module having a visible light camera for capturing at least one of a video and an image. The camera generates a data signal, in response to the camera capturing the video and/or image of an outdoor scene that is external to the motor vehicle. The enhanced imaging system can further include a graphics processor configured to determine whether the video and/or image is an HDR video or an HDR image, in response to the graphics processor receiving the data signal from the vision processing module. The graphics processor is further configured to tone map the video and/or image to generate an RGB histogram including an overall tonal range, in response to the graphics processor determining that the video and/or image is one of the HDR video and the HDR image. The graphics processor is further configured to compare the overall tonal range to a tonal threshold and detect one or more objects having associated boundaries. Each boundary surrounds an interior region having an object tonal value, and the boundary separates the interior region from an exterior region having an exterior tonal value. The graphics processor is further configured to generate an optimized signal for transforming the tone mapping to increase a difference between the object tonal value and the exterior tonal value, in response to the graphics processor determining that the overall tonal range is above the tonal threshold. The enhanced imaging system can further include a display device for receiving the optimized signal from the graphics processor and displaying an optimized video or an optimized image, in response to the display device receiving the optimized signal from the graphics processor.

In one aspect, the graphics processor is further configured to detect the object, in response to the graphics processor detecting that the boundary defines a closed profile surrounding the interior region of the object.

In another aspect, the graphics processor is further configured to detect at least a portion of the boundary, in response to the graphics processor detecting that a tone gradient separates the exterior region of the object and the interior region of the object from one another.

In another aspect, the graphics processor is configured to detect at least a portion of the boundary, in response to the graphics processor determining that the difference between the object tonal value and the exterior tonal value is at least 60.

In another aspect, the graphics processor determines that the overall tonal range is above the tonal threshold, in response to the graphics processor determining that the overall tonal range is between 64 and 192.

In another aspect, the graphics processor generates the optimized signal in real time, in response to the graphics processor receiving the data signal for displaying the video and/or image on the display device.

In another aspect, the graphics processor generates the optimized signal, in response to the graphics processor recording the data signal for playing back the video and/or image on the display device.

According to several aspects of the present disclosure, one example of a motor vehicle includes a passenger cabin and a dashboard, which faces the passenger cabin and includes first and second portions adjacent to one another. The motor vehicle further includes an instrument panel cluster that is attached to the first portion of the dashboard and faces the passenger cabin. The motor vehicle further includes a center stack that is attached to the second portion of the dashboard and faces the passenger cabin. The motor vehicle further includes an enhanced imaging system having a vision processing module. The vision processing module includes a camera for capturing at least one of a video and an image of an outdoor scene that is external to the passenger cabin. The camera generates a data signal, in response to the camera capturing the video and/or image. The enhanced imaging system further includes a graphics processor configured to determine whether the video and/or image is an HDR video or an HDR image, in response to the graphics processor receiving the data signal from the vision processing module. The graphics processor is further configured to tone map the video and/or image to generate an RGB histogram including an overall tonal range, in response to the graphics processor determining that the video and/or image is one of the HDR video and the HDR image. The graphics processor is further configured to compare the overall tonal range of an entire frame for the video and/or image to a tonal threshold. The graphics processor is further configured to detect one or more objects having associated boundaries. Each boundary surrounds an interior region having an object tonal value, and each boundary separates the interior region from an exterior region having an exterior tonal value. The graphics processor is further configured to generate an optimized signal for transforming the tone mapping to increase a difference between the object tonal value and the exterior tonal value, in response to the graphics processor determining that the overall tonal range for the entire frame for the video and/or image is above the tonal threshold. The enhanced imaging system further includes a display device mounted to at least one of the instrument panel cluster and the center stack, with the display device being configured to display one of an optimized video and an optimized image, in response to the display device receiving the optimized signal from the graphics processor.

In one aspect, the motor vehicle further includes a front end structure disposed forward of the passenger cabin, a rear end structure disposed rearward of the passenger cabin, at least one side view mirror disposed laterally outboard of the passenger cabin, and a rear view mirror module disposed within the passenger cabin. The camera is mounted to one of the front end structure, the rear end structure, one or more side view mirrors, and the rear view mirror module.

In another aspect, the vision processing module includes a plurality of the cameras mounted to an associated one of the front end structure, the rear end structure, the side view mirrors, and the rear view mirror module.

In another aspect, the graphics processor is further configured to detect the object, in response to the graphics processor detecting that the boundary defines a closed profile surrounding the interior region of the object.

In another aspect, the graphics processor is further configured to detect at least a portion of the boundary, in response to the graphics processor detecting that a tone gradient separates the exterior region of the object and the interior region of the object from one another.

In another aspect, the graphics processor determines that the overall tonal range is above the tonal threshold, in response to the graphics processor determining that the overall tonal range for an entire frame of the video and/or image is between 64 and 192.

In another aspect, the graphics processor generates the optimized signal in real time, in response to the graphics processor receiving the data signal for displaying the video and/or image on the display device.

According to several aspects of the present disclosure, one example of a method for operating an enhanced imaging system for a motor vehicle is provided. The motor vehicle includes a passenger cabin, and the enhanced imaging system includes a vision processing module with a camera, a graphics processor, and a display device. The camera captures at least one of a video and an image of an outdoor scene that is external to the passenger cabin. The camera generates a data signal, in response to the camera capturing the video and/or image. A graphics processor determines whether the video and/or image is an HDR video and/or an HDR image, in response to the graphics processor receiving the data signal from the vision processing module. The graphics processor tone maps the video and/or image to generate an RGB histogram including an overall tonal range, in response to the graphics processor determining that the video and/or image is one of the HDR video and the HDR image. The graphics processor compares the overall tonal range for an entire frame of the video and/or image to a tonal threshold, and the graphics processor detects one or more objects having associated boundaries. Each boundary surrounds an interior region having an object tonal value, and the boundary separates the interior region from an exterior region having an exterior tonal value. The graphics processor generates an optimized signal for transforming the tone mapping to increase a difference between the object tonal value and the exterior tonal value, in response to the graphics processor determining that the overall tonal range for the entire frame of the video and/or image is above the tonal threshold. The display device receives the optimized signal from the graphics processor, and the display device displays one of an optimized video and an optimized image, in response to the display device receiving the optimized signal from the graphics processor.

In one aspect, the graphics processor detects the object, in response to the graphics processor detecting that the boundary defines a closed profile surrounding the interior region of the object.

In another aspect, the graphics processor detects at least a portion of the boundary, in response to the graphics processor detecting that a tone gradient separates the exterior region of the object and the interior region of the object from one another.

In another aspect, the graphics processor detects at least a portion of the boundary, in response to graphics processor determining that the difference between the object tonal value and the exterior tonal value is at least 60.

In another aspect, the graphics processor determines that the overall tonal range is above the tonal threshold, in response to the graphics processor determining that the overall tonal range for an entire range of the video and/or image is between 64 and 192.

In another aspect, the graphics processor generates the optimized signal in real time, in response to the graphics processor receiving the data signal for displaying the video and/or image on the display device.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
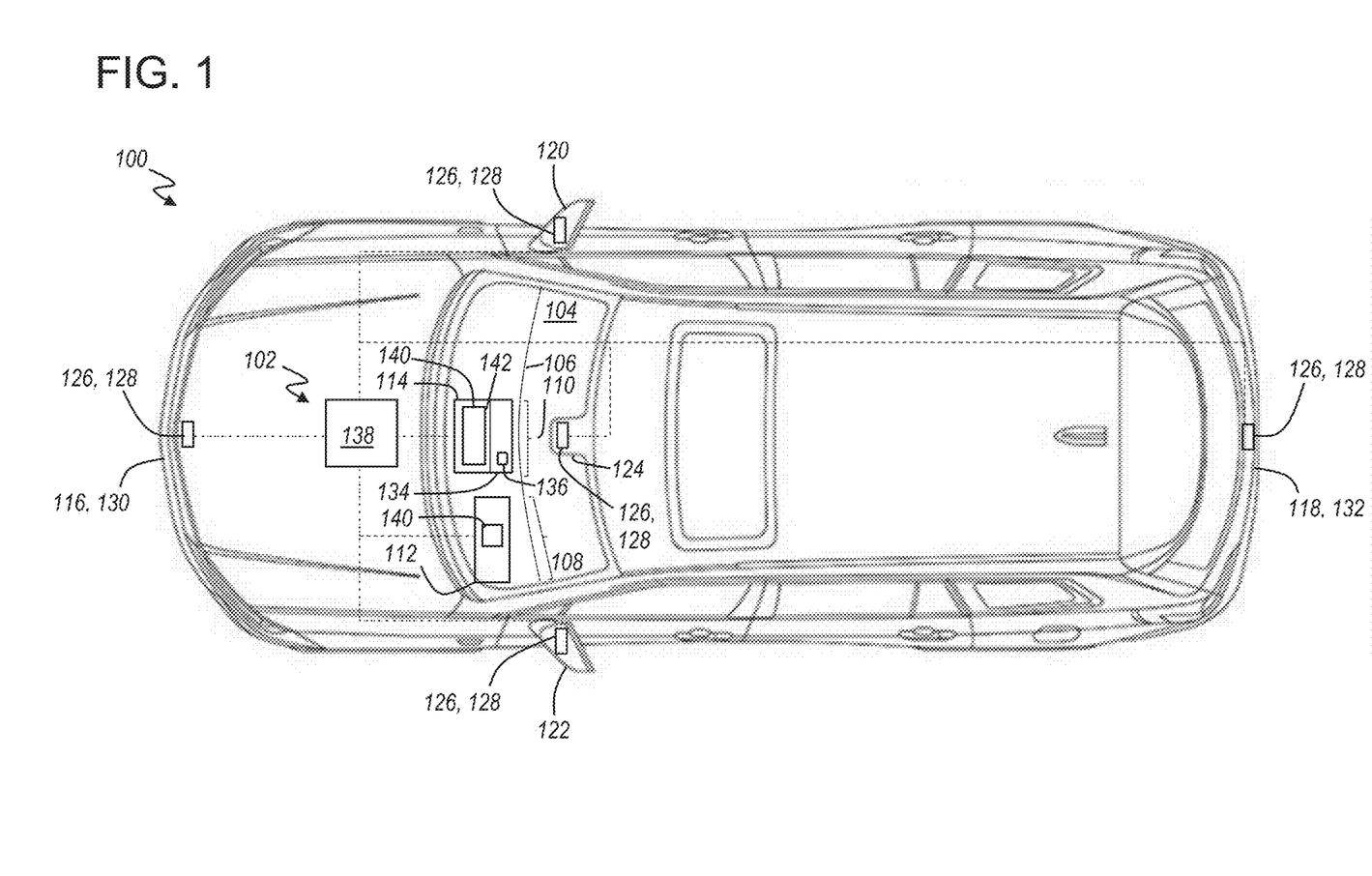
FIG. 1 is a schematic diagram of a motor vehicle having one example an enhanced imaging system.

Referring to FIG. 1, one example of a motor vehicle 100 having an enhanced imaging system 102 captures video and/or images, and the system 102 manipulates video and/or images in real-time to optimize tone composition, reduce haziness, and improve readability. As described in detail below, the system 102 utilizes High-Dynamic-Range analysis (HDR analysis), tone mapping, and boundary detection of objects to modify or alter highlights, mid-tones, or shadows of the input frame, such that rendered content can be perceived with reduced haze to enable the driver to view objects more clearly and improve driving decisions.

The motor vehicle 100 includes a passenger cabin 104 and a dashboard 106, which faces the passenger cabin 104 and has first and second portions 108, 110 disposed adjacent to one another. The motor vehicle 100 further includes an instrument panel cluster 112 that is attached to the first portion 108 of the dashboard 106 and faces the passenger cabin 104. In this example, the first portion 108 of the dashboard 106 is positioned forward from the driver seat. The motor vehicle 100 further includes a center stack 114 that is attached to the second portion 110 of the dashboard 106 and faces the passenger cabin 104. In this example, the second portion 110 of the dashboard 106 is positioned at the center of the dashboard. The motor vehicle 100 further includes a front end structure 116 disposed forward of the passenger cabin 104. In this example, the front end structure 116 includes a front grill 130 of the vehicle. The motor vehicle 100 further includes a rear end structure 118 disposed rearward of the passenger cabin 104. In this example, the rear end structure 118 can include a portion of a rear liftgate 132 or a rear trunk lid adjacent to a license plate display surface. It is contemplated the front and rear end structures include various other body structures. The motor vehicle 100 further includes one or more side view mirror modules 120, 122 disposed laterally outboard of the passenger cabin 104, and a rear view mirror module 124 disposed within the passenger cabin 104.

The enhanced imaging system 102 includes a vision processing module 126 having one or more visible light cameras 128 for capturing visible light with wavelengths from 380 nanometers to 700 nanometers. The camera is positioned to capture a video and/or image of objects that are disposed external to the passenger cabin 104, and the camera 128 is configured to generate a data signal, in response to the camera 128 capturing the video and/or image. In this example, the vision processing module 126 includes a plurality of the cameras 128 mounted to an associated one of the front grill 130, the rear liftgate 132, the side view mirror modules 120, 122, and the rear view mirror module 124. However, it is contemplated that the motor vehicle can have more or fewer than five cameras attached to other portions of the front end structure 116, the rear end structure 118, or any other region of the vehicle.

Continuing with the previous example, the enhanced imaging system 102 further includes a user interface 134 having a switch 136, such as a toggle button, adapted to be actuated by a user for enabling an HDR mode of the vision processing module 126. As one example, the user may actuate the switch 136 when he perceives visibility to be degraded under foggy or hazy weather conditions. However, other examples of the system may not include a user interface where the system operates independently and does not require user intervention.

The enhanced imaging system 102 further includes a graphics processor 138 configured to determine whether the video and/or image is a High-Dynamic-Range video (HDR video) or a High-Dynamic-Range image (HDR image), in response to the graphics processor 138 receiving the data signal from the vision processing module 126.

The graphics processor 138 is further configured to tone map at least one of the video and/or image to generate an RGB histogram including an overall tonal range, in response to the graphics processor 138 determining that the video and/or image is an HDR video and/or HDR image. The graphics processor 138 is further configured to compare the overall tonal range for the entire frame of the video and/or image to a tonal threshold. In this example, the tonal threshold is 127 such that the graphics processor 138 determines that the overall tonal range is above the tonal threshold, in response to the graphics processor 138 determining that the overall tonal range for the entire frame of the video and/or image is between 64 and 192. Put another way, the graphics processor 138 determines that the overall tonal range for all pixel values is above the tonal threshold, such that light has been attenuated to reduce contrast and airlight is producing the associated whiteout condition.

The graphics processor 138 is further configured to detect all objects in the frame of the video and/or image. More specifically, the processor 138 detects all boundaries or edges that are separating highlights, mid-tones, and shadows from one another. Each boundary surrounds an interior region having an object tonal value, and the boundary separates the interior region from an exterior region having an exterior tonal value. The graphics processor 138 is further configured to detect the object, in response to the graphics processor 138 detecting that the boundary is entirely within a field of the camera's view and further detecting that the boundary defines a closed profile surrounding the interior region of the object. The graphics processor 138 is further configured to detect at least a portion of the boundary, in response to the graphics processor 138 detecting that a tone gradient separates the exterior region and the interior region from one another. In one example, the graphics processor 138 is configured to detect at least a portion of the boundary, in response to processor 138 determining that the difference between the object tonal value and the exterior tonal value is at least 60.

In other examples, the graphics processor 138 is further configured to detect an object only partially within the frame of the video and/or image, in response to the graphics processor 138 detecting that the boundary defines an open profile cooperating with outermost field of view to surround an interior region having a number of pixels that is less than a predetermined pixel threshold. As one example, the graphics processor 138 may detect a vehicle only partially within the field of view of the camera, and the boundary of the vehicle may cooperate with the outermost edge of the field of view to surround the visible portion of the vehicle. If this visible portion includes a number of pixels below the predetermined pixel threshold, the graphics processor 138 may classify the detected vehicle as an object to be altered by the system 102. As yet another example, the graphics processor 138 may detect a visible portion of the sky within the field of view of the camera, and the boundary of the sky may be defined by the terrain or skyline and an upper outermost edge of field of view. If this visible portion of the sky includes a number of pixels above the predetermined threshold, the graphics processor may classify the sky as a non-object that will not be altered by the enhanced imaging system 102. It is contemplated that the graphics processor can include any suitable pixel threshold, lookup table, algorithm, or other method for classifying portions of the video and/or image to be altered.

The graphics processor 138 is further configured to generate an optimized signal for transforming the tone mapping of each classified object to increase a difference between the object tonal value and the exterior tonal value, in response to the graphics processor 138 determining that the overall tonal range is above the tonal threshold. Put another way, the graphics processor 138 alters or modifies the image to darken the darker of the interior region and the exterior region and lighten the lighter of the interior region and the exterior region, so as to enhance the driver's perception of the object, in response to the graphics processor determining that the vehicle is being operated under degraded visual conditions. In this example, the graphics processor 138 generates the optimized signal in real time, in response to the graphics processor 138 receiving the data signal and displaying the video and/or image on the display device in real time. In other examples, the graphics processor generates the optimized signal, in response to the graphics processor recording the data signal for playing back the video and/or image on the display device at a later time.

The enhanced imaging system 102 may further include a display device 140 mounted the instrument panel cluster 112 or the center stack 114, with the display device 140 being a high resolution touch screen 142, such as an LCD (Liquid Crystal Display) or TFT (Thin Film Transistor). The display device 140 is configured to receive the optimized signal from the graphics processor 138 and display one of an optimized video and/or an optimized image, in response to the display device 140 receiving the optimized signal from the graphics processor 138. In other examples, the display device can be a heads up display (HUD) mounted to the first portion of the dashboard above the instrument panel cluster, a 3D hologram LED fan display, or other suitable devices.

Figure 2:
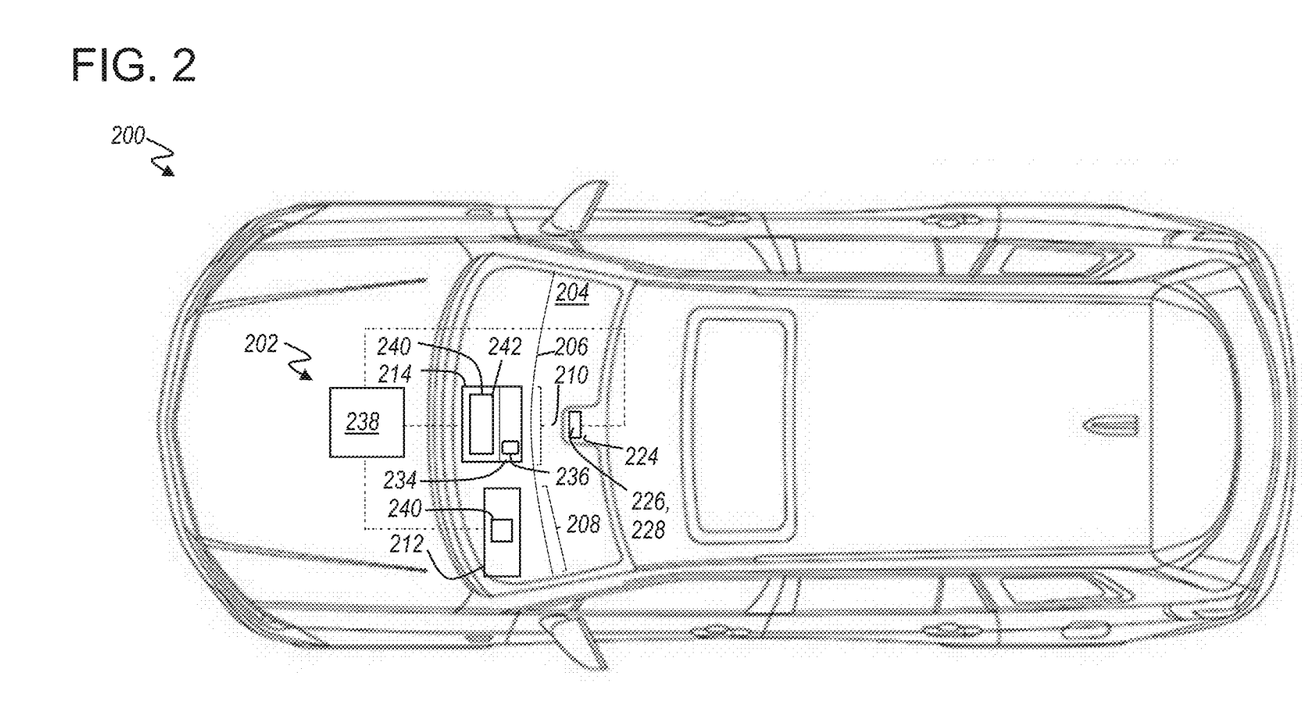
FIG. 2 is a schematic diagram of the motor vehicle of FIG. 1, illustrating the motor vehicle having another example of an enhanced imaging system.

Referring to FIG. 2, another example of a motor vehicle 200 is similar to the motor vehicle 100 of FIG. 1 and has the same components identified by the same reference numbers increased by 100. However, while the enhanced imaging system 102 of FIG. 1 includes multiple cameras 128, the enhanced imaging system 202 of FIG. 2 includes a single camera 228, and this camera 228 is attached to the rear view mirror module 224. It is contemplated that the enhanced imaging system can have any number of cameras mounted to any portion of the vehicle.

Figure 3:
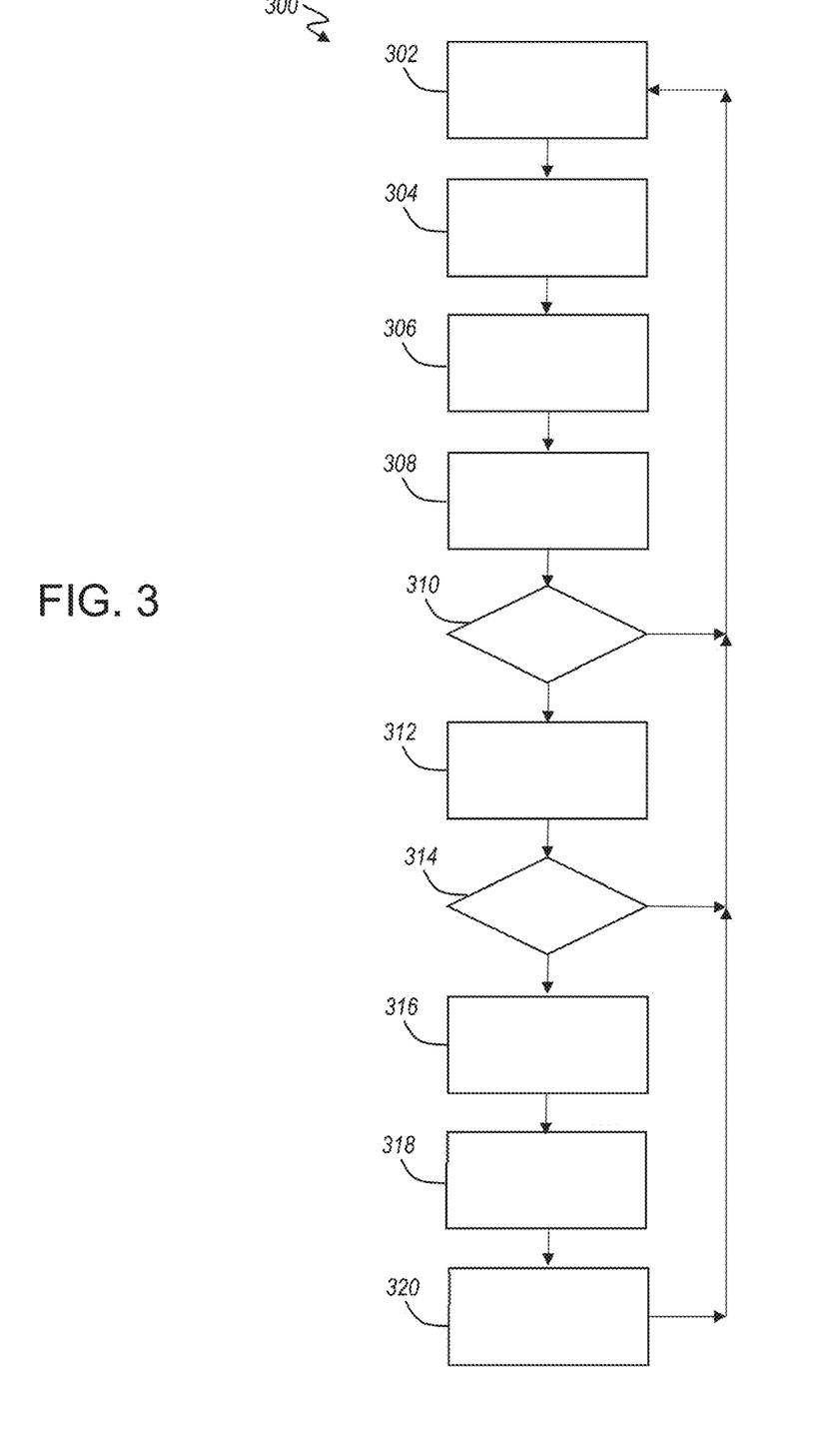
FIG. 3 is a flow chart for an example of a method for operating the enhanced imaging system of FIG. 1.

Referring to FIG. 3, a flowchart for one example of a method 300 for operating the enhanced imaging system 102 for the motor vehicle 100 of FIG. 1 is provided. The method 300 commences at block 302 with the cameras 128 capturing video and/or images in Low-Dynamic-Range format (LDR format).

At block 304, the user determines that the vehicle 100 is being operated under degraded visual conditions and actuates the user interface 134, such as the switch 136 on the dashboard 106, to turn on the HDR mode of the system 102 to provide enhanced video and/or image.

At block 306, the cameras 128 capture video and/or images external to the passenger cabin 104 in HDR format.

At block 308, the camera 128 generates a data signal, in response to the camera 128 capturing the video and/or image.

At block 310, the graphics processor 138 determines whether the video and/or image is one of an HDR video and an HDR image. If the graphics processor 138 determines that the video and/or image are not in HDR format but rather in Low-Dynamic-Range format (LDR format), then the method 300 returns to step 302. It is contemplated that the vision processing module 126 may be utilized with other systems such that the method can be interrupted by other systems, such as an infotainment system utilizing the display device for displaying content in LDR format. If the graphics processor 138 determines that the video and/or image are in HDR format, the method proceeds to block 312.

At block 312, the graphics processor tone maps the video and/or image to generate an RGB histogram including an overall tonal range for an entire frame of the video and/or image.

At block 314, the graphics processor 138 compares the overall tonal range of the entire frame of the video and/or image to a tonal threshold. If any portion of the overall tonal range is below the tonal threshold, the graphics processor 138 determines that the video and/or image has not been degraded by fog, smoke, smog, mist, or haze, and the method returns to block 302. If the overall tonal range for the entire frame is above the tonal threshold, the graphics processor 138 determines that the video and/or image has been degraded, the method proceeds to block 316.

In one example, the tonal threshold may be 127, such that the graphics processor 138 determines that the video and/or image has been degraded, in response to the graphics processor 138 determining that the overall tonal range of the entire frame is in the range between 64 and 192, inclusively. Put another way, if every pixel of the frame is above 127, the graphics processor 138 determines that the video and/or image has been degraded by fog, smoke, smog, mist, or haze. In other examples, the graphics processor can utilize other thresholds, a lookup table, algorithm, or other suitable methods for determining that the video and/or image has been degraded At block 316, the graphics processor 138 identifies all objects within the frame of the video and/or image. In this example, the graphics processor searches for all boundaries between adjacent regions having associated luminance or tonal values that are different from one another. Each boundary surrounds an interior region having an object tonal value, and each boundary separates the interior region from an exterior region having an exterior tonal value. In this example, the graphics processor 138 detects at least a portion of the boundary, in response to processor 138 determining that the difference between the object tonal value and the exterior tonal value is at least 60. It is contemplated that a difference threshold in tonal values can be above or below 60. As but one example, a distant vehicle that is somewhat obscured by fog can present itself entirely within the video and/or image as a discernibly closed profile or boundary surrounding an interior region, and the interior region can have a tonal value that is lower than the tonal value of the surrounding fog.

The graphics processor 138 is configured to detect a boundary in the form of a tone gradient separating the exterior region of the object and the interior region of the object from one another, such that the tonal value gradually transitions from the object tonal value to the exterior tonal value. It is contemplated that degraded visual conditions can blur the edge or boundary of a vehicle or other object.

In another example, the graphics processor 138 is configured to detect the boundary in the form of a discrete edge that provides an immediate change in tonal value from the interior region to the exterior region of the object. The method further includes a subroutine for identifying, tracking, classifying, and logging each detected boundary or edge for determining whether the detected boundary is associated with an object.

At block 318, the graphics processor 138 generates an optimized signal for transforming the tone mapping to increase a difference between the object tonal value and the exterior tonal value to lighten the lighter of the interior and the exterior and darken the darker of the interior and the exterior. In this example, the graphics processor 138 generates the optimized signal in real time, in response to the graphics processor 138 receiving the data signal for simultaneously displaying the video and/or the image on the display device 140. In other examples, the graphics processor may record the data signal and later generate the optimized signal for playing back the video and/or image on the display device 140.

At block 320, the display device 140 receives the optimized signal from the graphics processor 138 and displays one of an optimized video and an optimized image, in response to the display device 140 receiving the optimized signal from the graphics processor 138.

Figure 4:
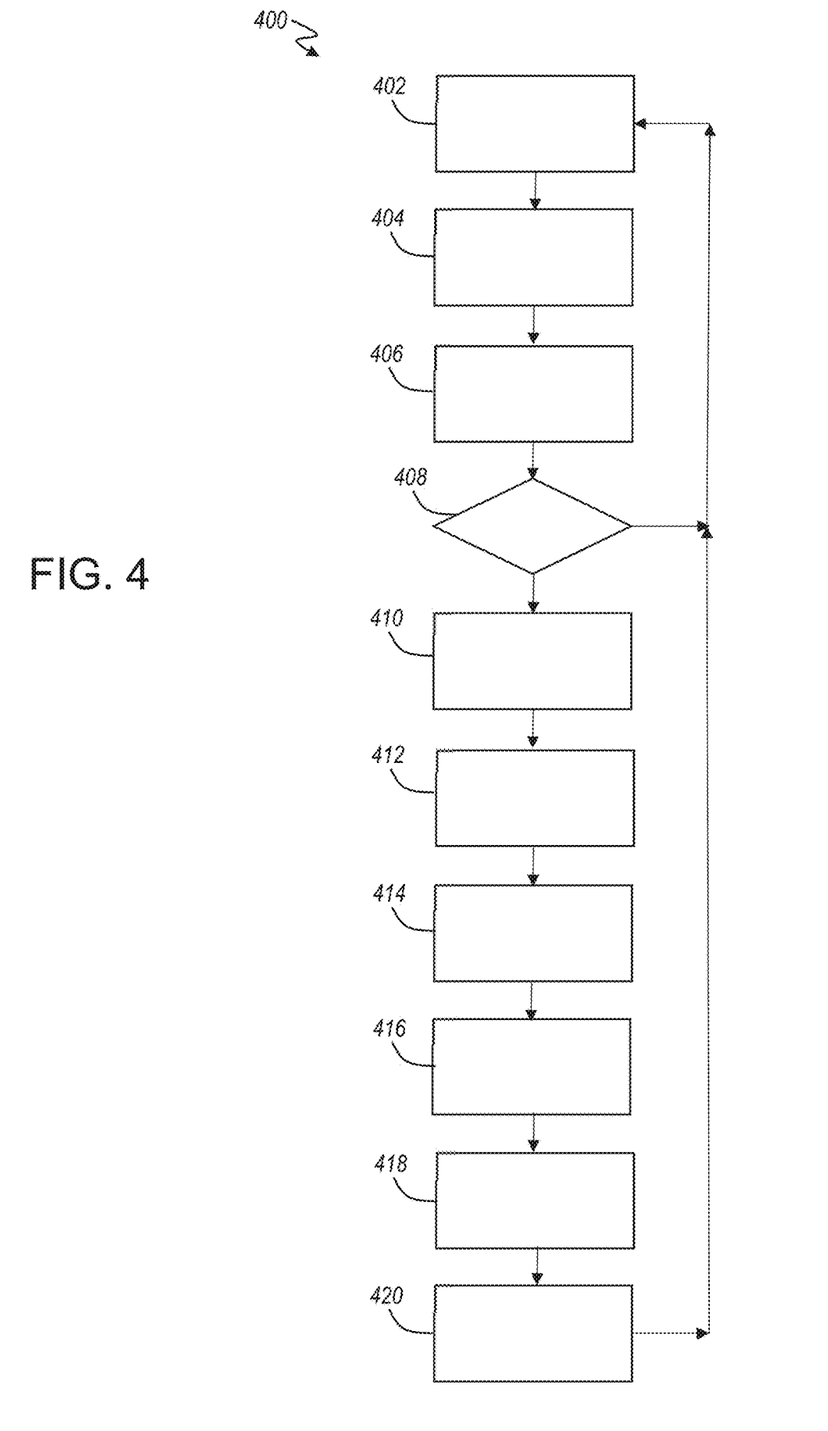
FIG. 4 is a flow chart for another example of a method for operating the enhanced imaging system of FIG. 1.

Referring to FIG. 4, a flowchart for another example of a method 400 is similar to the method 300 of FIG. 3. However, while the method 300 of FIG. 3 includes the user determining that the vehicle 100 is being operated under degraded visual conditions and manually actuating the user interface 134 to activate the system 102 at block 304, the method 400 of FIG. 4 includes the system 102 automatically determining that the vehicle 100 is being operated under degraded visual conditions and automatically actuating the system 102 to enhance driver vision. The method commences at block 402 with the cameras 128 capturing video and/or images in LDR format.

At block 404, the camera 128 generates a data signal, in response to the camera 128 capturing the video and/or image in LDR format.

At block 406, the graphics processor 138 tone maps the video and/or image to generate an RGB histogram including an overall tonal range.

At block 408, the graphics processor 138 compares the overall tonal range of an entire frame of the video and/or image to a tonal threshold. If the tonal range of a portion of the frame for the video and/or image is below the tonal threshold, the graphics processor 138 determines that the video and/or image has not been degraded by fog, smoke, smog, mist, or haze, and the method returns to block 402. If the overall tonal range of the entire frame for the video and/or image is above the tonal threshold, the graphics processor 138 determines that the video and/or image has been degraded, and the method proceeds to block 410.

At block 410, the processor 138 actuates the vision processing module 126 to operate in HDR mode and actuates the cameras 128 to capture video and/or images in HDR format.

At block 412, the camera 128 generates a data signal, in response to the camera 128 capturing the video and/or image in HDR format.

At block 414, the graphics processor 138 tone maps the video and/or image to generate an RGB histogram including an overall tonal range.

At block 416, the graphics processor 138 identifies all objects within the frame of the video and/or image. In this example, the graphics processor 138 searches for all boundaries or edges between adjacent regions having associated luminance or tonal values that are different from one another. The boundary may completely surround an interior region having an object tonal value, and the boundary may separate the interior region from an exterior region having an exterior tonal value different from the object tonal value. In this example, the graphics processor 138 detects at least a portion of the boundary, in response to processor 138 determining that the difference between the object tonal value and the exterior tonal value is at least 60. However, it is contemplated that the difference threshold in tonal values can be above or below 60.

At block 418, the graphics processor 138 generates an optimized signal for transforming the tone mapping to increase a difference between the object tonal value and the exterior tonal value. In this example, the graphics processor 138 generates the optimized signal in real time, in response to the graphics processor 138 receiving the data signal for simultaneously displaying the video and/or the image on the display device 140. In other examples, the graphics processor may record the data signal and later generate the optimized signal for playing back the video and/or image on the display device 140.

At block 420, the display device 140 receives the optimized signal from the graphics processor 138 and displays one of an optimized video and an optimized image, in response to the display device receiving the optimized signal from the graphics processor 138.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An enhanced imaging system for a motor vehicle, the enhanced imaging system comprising:
   a vision processing module including a camera for capturing at least one of a video and an image, and the camera generating a data signal, in response to the camera capturing at least one of the video and the image;
   a graphics processor configured to:
      determine whether at least one of the video and the image comprises one of an HDR video and an HDR image, in response to the graphics processor receiving the data signal from the vision processing module;
      tone map at least one of the video and the image to generate an RGB histogram including an overall tonal range, in response to the graphics processor determining that at least one of the video and the image comprises one of the HDR video and the HDR image;
      compare the overall tonal range to a tonal threshold;
      detect at least one object having a boundary, with the boundary surrounding an interior region that has an object tonal value and separating the interior region from an exterior region that has an exterior tonal value; and
      generate an optimized signal for transforming the tone mapping to increase a difference between the object tonal value and the exterior tonal value, in response to the graphics processor determining that the overall tonal range is above the tonal threshold; and
   a display device for receiving the optimized signal from the graphics processor and displaying one of an optimized video and an optimized image, in response to the display device receiving the optimized signal from the graphics processor.

2. The enhanced imaging system of claim 1 wherein the graphics processor is further configured to detect the object, in response to the graphics processor detecting that the boundary defines a closed profile surrounding the interior region of the object.

3. The enhanced imaging system of claim 2 wherein the graphics processor is further configured to detect at least a portion of the boundary, in response to the graphics processor detecting that a tone gradient separates the exterior region of the object and the interior region of the object from one another.

4. The enhanced imaging system of claim 3 wherein the graphics processor is configured to detect at least a portion of the boundary, in response to graphics processor determining that the difference between the object tonal value and the exterior tonal value is at least 60.

5. The enhanced imaging system of claim 4 wherein the graphics processor determines that the overall tonal range is above the tonal threshold, in response to the graphics processor determining that the overall tonal range is between 64 and 192.

6. The enhanced imaging system of claim 5 wherein the graphics processor generates the optimized signal in real time, in response to the graphics processor receiving the data signal for displaying at least one of the video and the image on the display device in real time.

7. The enhanced imaging system of claim 5 wherein the graphics processor generates the optimized signal, in response to the graphics processor recording the data signal for playing back at least one of the video and the image on the display device.

8. A motor vehicle comprising:
a passenger cabin;
a dashboard facing the passenger cabin and having first and second portions adjacent to one another;
an instrument panel cluster attached to the first portion of the dashboard and facing the passenger cabin;
a center stack attached to the second portion of the dashboard and facing the passenger cabin; and
an enhanced imaging system comprising:
a vision processing module including a camera for capturing at least one of a video and an image external to the passenger cabin, and the camera generating a data signal, in response to the camera capturing at least one of the video and the image;
a graphics processor configured to:
determine whether at least one of the video and the image comprises one of an HDR video and an HDR image, in response to the graphics processor receiving the data signal from the vision processing module;
tone map at least one of the video and the image to generate an RGB histogram including an overall tonal range, in response to the graphics processor determining that at least one of the video and the image comprises one of the HDR video and the HDR image;
compare the overall tonal range to a tonal threshold;
detect at least one object having a boundary, with the boundary surrounding an interior region that has an object tonal value and separating the interior region from an exterior region that has an exterior tonal value; and
generate an optimized signal for transforming the tone mapping to increase a difference between the object tonal value and the exterior tonal value, in response to the graphics processor determining that the overall tonal range is above the tonal threshold; and
a display device mounted to at least one of the instrument panel cluster and the center stack, with the display device being configured to receive the optimized signal from the graphics processor and display one of an optimized video and an optimized image, in response to the display device receiving the optimized signal from the graphics processor.

9. The motor vehicle of claim 8 further comprising:
a front end structure disposed forward of the passenger cabin;
a rear end structure disposed rearward of the passenger cabin;
at least one side view mirror disposed laterally outboard of the passenger cabin; and
a rear view mirror module disposed within the passenger cabin;
wherein the camera is mounted to one of the front end structure, the rear end structure, the at least one side view mirror, and the rear view mirror module.

10. The motor vehicle of claim 8 further comprising:
a front end structure disposed forward of the passenger cabin;
a rear end structure disposed rearward of the passenger cabin;
at least one side view mirror disposed laterally outboard of the passenger cabin; and
a rear view mirror module disposed within the passenger cabin;
wherein the vision processing module includes a plurality of the cameras mounted to an associated one of the front end structure, the rear end structure, the at least one side view mirror, and the rear view mirror module.

11. The motor vehicle of claim 8 wherein the graphics processor determines that the overall tonal range is above the tonal threshold, in response to the graphics processor determining that the overall tonal range is between 64 and 192.

12. The motor vehicle of claim 8 wherein the graphics processor is further configured to detect the object, in response to the graphics processor detecting that the boundary defines a closed profile surrounding the interior region of the object.

13. The motor vehicle of claim 12 wherein the graphics processor is further configured to detect at least a portion of the boundary, in response to the graphics processor detecting that a tone gradient separates the exterior region of the object and the interior region of the object from one another.

14. The motor vehicle of claim 13 wherein the graphics processor generates the optimized signal in real time, in response to the graphics processor receiving the data signal for displaying at least one of the video and the image on the display device in real time.

15. A method for operating an enhanced imaging system for a motor vehicle having a passenger cabin, and the enhanced imaging system includes a vision processing module with a camera, a graphics processor, and a display device, the method comprising:
capturing, using the camera, at least one of a video and an image external to the passenger cabin;
generating, using the camera, a data signal, in response to the camera capturing at least one of the video and the image;
determining, using the graphics processor, whether at least one of the video and the image comprises one of an HDR video and an HDR image, in response to the graphics processor receiving the data signal from the vision processing module;
tone mapping, using the graphics processor, at least one of the video and the image to generate an RGB histogram including an overall tonal range, in response to the graphics processor determining that at least one of the video and the image comprises one of the HDR video and the HDR image;

comparing, using the graphics processor, the overall tonal range to a tonal threshold;

detecting, using a graphics processor, at least one object having a boundary surrounding an interior region that has an object tonal value and separating the interior region from an exterior region that has an exterior tonal value; and generating, using the graphics processor, an optimized signal for transforming the tone mapping to increase a difference between the object tonal value and the exterior tonal value, in response to the graphics processor determining that the overall tonal range is above the tonal threshold; and receiving, with the display device, the optimized signal from the graphics processor and displaying, using the display device, one of an optimized video and an optimized image, in response to the display device receiving the optimized signal from the graphics processor.

16. The method of claim 15 further comprising detecting, using the graphics processor, the object, in response to the graphics processor detecting that the boundary defines a closed profile surrounding the interior region of the object.

17. The method of claim 16 further comprising detecting, using the graphics processor, at least a portion of the boundary, in response to the graphics processor detecting that a tone gradient separates the exterior region of the object and the interior region of the object from one another.

18. The method of claim 17 further comprising detecting, using the graphics processor, at least a portion of the boundary, in response to graphics processor determining that the difference between the object tonal value and the exterior tonal value is at least 60.

19. The method of claim 18 further comprising determining, using the graphics processor, that the overall tonal range is above the tonal threshold, in response to the graphics processor determining that the overall tonal range is between 64 and 192.

20. The method of claim 19 further comprising generating, using the graphics processor, the optimized signal in real time, in response to the graphics processor receiving the data signal for displaying at least one of the video and the image on the display device in real time.

* * * * *